Sept. 20, 1949.  F. J. NAGEL  2,482,499
LAMINATES EMBODYING MIXED PHENOL-ARYLAMINE-FORMALDEHYDE
RESINOUS PRODUCTS
Filed May 21, 1946
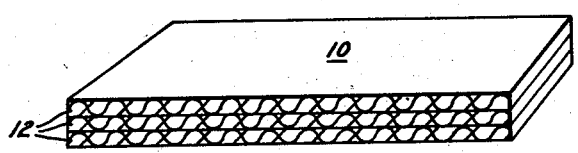
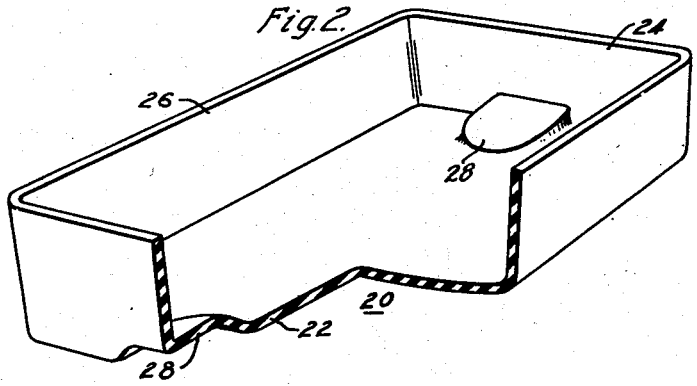
WITNESSES:
INVENTOR
Fritz J. Nagel.
BY
Ezra W. Savage
ATTORNEY Patented Sept. 20, 1949

2,482,499

UNITED STATES PATENT OFFICE 2,482,499

LAMINATES EMBODYING MIXED PHENOL-ARYLAMINE-FORMALDEHYDE RESINOUS PRODUCTS

Fritz J. Nagel, Pittsburgh, Pa., assignor to Westinghouse Electric Corporation, East Pittsburgh, Pa., a corporation of Pennsylvania Application May 21, 1946, Serial No. 671,383

7 Claims. (Cl. 117—76)

This invention relates to resinous compositions and, in particular, to laminated products embodying thermoset resinous binders.

Heretofore, thermosetting phenolic resins have been prepared in a variety of modifications. Each modification was characterized by superiority in some one feature or property. Thus, for example, straight phenol formaldehyde resins have been considered as superior for uses requiring high tensile strength and similar physical properties. The reaction products of aniline, phenol and formaldehyde have been particularly satisfactory for use in electrical insulating applications. Phenolic resins modified with tung oil have been preferred for applications wherein punching is required in forming laminated products.

However, for many purposes, two or more properties may be critical in order to adequately satisfy the requirements thereof. Since no single phenol aldehyde composition known heretofore was usually satisfactory in meeting a plurality of such requirements, it has been necessary to compromise the requirements and oftentimes select a phenolic resin not entirely satisfactory on all counts. Obviously, the industry has been handicapped in satisfying the requirements of the trade.

The object of the present invention is to provide thermosetting phenolic resins in combination with fibrous material for producing laminates having exceptionally good mechanical, electrical and other characteristics.

A further object of the invention is to provide a combination of two amine phenolic resins suitable for producing laminates capable of meeting a plurality of critical requirements.

Other objects of the invention will, in part, be obvious and will, in part, appear hereinafter. For a better understanding of the nature and objects of this invention, reference should be had to the following detailed description and drawing, in which:

Figure 1 is a view in perspective partly in cross section of a laminate prepared in accordance with the invention, and Fig. 2 is a view in perspective partly broken of a post-formed laminate.

It has been discovered that fibrous sheet material may be treated with a combination of two thermosetting amine type phenolic resins whereby laminates are produced having exceptional over-all characteristics not attainable heretofore in any single phenolic resin. In particular, the combination of resins is composed of (A) the reaction product of a phenol, a secondary diaryl monoamine and formaldehyde or a polymer capable of producing formaldehyde, and (B) the reaction product of a phenol, a primary monoaryl amine and formaldehyde or a substance capable of producing formaldehyde. For the purpose of this invention, from 1 to 10 parts by weight of the resin (A) to from 10 to 1 parts of the resin (B) may be combined.

The phenols that may be employed for producing the reaction products (A) and (B) may be hydroxybenzene, cresylic acid, cresols and similar homologues. The secondary diaryl monoamine may be diphenylamine, ditolylamine, dinaphthylamine and similar homologues. For the primary monoarylamine, there may be employed aniline, toluidine, xylidine and like homologues. Formaldehyde may be employed in the reaction products either as an aqueous solution containing from 37% to 40% formaldehyde for example, or paraformaldehyde, trioxane and polyoxymethylene. In some cases hexamethylene-tetramine may be applied to furnish at least a portion of the formaldehyde.

In preparing the reaction product (A), the proportions of the ingredients may comprise for each mole of a phenol from 0.1 to 0.6 mole of the diarylamine, such as diphenylamine, and from 0.8 to 1.5 moles of formaldehyde or a polymer thereof for the total moles of phenol and the diarylamine. The following example is a typical mode of preparation of the resin (A):

Example I

Phenol_____ 94 parts by weight (1 mole)
Diphenylamine____ 28 parts by weight (⅙ mole)
Formaldehyde_____ 40 parts (1.33 moles)

The reactants were placed in a closed reaction vessel equipped with a stirrer, refluxing column, heating means and connections for evacuation. An alkaline catalyst such, for example, as one-half part by weight of lime (calcium hydroxide) was added. Other suitable catalysts are barium hydroxide, ammonium hydroxide, ethylene diamine and hexamethylene tetramine. The reaction vessel was heated to a temperature of 95° C. until refluxing started. The refluxing was continued for thirty minutes and then the vessel was evacuated to remove water vapor and unreacted volatile matter. The temperature of the reaction product rose to about 110° C. during the evacuation. The reaction was terminated by adding 140 parts by weight of a solvent composed of equal parts of equal alcohol and benzol. The solution so prepared was suitable for use as an impregnating varnish. It was capable of reacting to a thermoset state.

In preparing the reaction product (B) for each mole of phenol there may be provided from 0.3 to 1.1 moles of a primary monoarylamine and sufficient formaldehyde to provide from 0.8 to 1.5 moles for each mole of phenol and from 0.8 to 2.5 moles of formaldehyde for each mole of the monoarylamine. An example of a typical composition is given in the following:

Example II

| | |
|---|---|
| Phenol | 94 parts (1 mole) |
| Aniline | 62 parts (⅔ mole) |
| Formaldehyde | 63 parts (157.5 parts 40% solution) (2.1 moles) |
| Ethylenediamine | ½ part | were placed in a closed reaction vessel similar to that described under Example I. The procedure of reaction followed that set forth in Example I.

In both Examples I and II, sufficient solvent may be added to produce solutions having from 60% resin solids to as low as 10% solids. For many purposes, solutions carrying from 40% to 50% resin solids are most advantageous for impregnating fibrous material.

The resin solutions described in Examples I and II may be admixed, that is, the varnishes may be combined in such proportions that from 10 parts to 1 part of the resin proper of Example I is present for from 10 to 1 parts of the resin proper of Example II. The mixture of varnishes may be then applied to various fibrous sheet materials. Suitable sheet materials for treatment are paper, cotton duck, asbestos cloth, various artificial fibrous materials, both woven or knitted such, for example, as regenerated cellulose, cellulose acetate, and superpolyamides. The following example illustrates the practice of the invention.

Example III 30 pounds of the diphenylamine-phenol-formaldehyde resin solution of Example I having a solids content of 50% was mechanically mixed with 30 pounds of the aniline-phenol-formaldehyde resin solution of Example II having a 50% solids content. The mixture so produced was applied to unbleached 6½ ounce cotton drill cloth in an amount to provide thereon solid resin in an amount equal to the weight of the cloth. The varnish impregnated cloth was treated in heated towers to remove the solvent and to convert the resin to a more advanced stage suitable for molding purposes. A plurality of layers of the resin treated cloth were superimposed and put into a heated laminating press and molded into a laminate at a pressure of 1,000 pounds per square inch for 55 minutes at 165° C.

Referring to Fig. 1 of the drawing, there is illustrated the laminate 10 resulting from the treatment. The laminations 12 of the drill cloth were impregnated and united by the mixed compositions (A) and (B) into a unitary product having special characteristics. The physical properties were as follows:

| | |
|---|---|
| Flexural strength flatwise | p. s. i. 27,000 |
| Flexural strength edgewise | p. s. i. 30,000 |
| Bond strength | pounds 1,750 |
| Compressive strength flatwise | p. s. i. 42,000 |

The electrical properties of the material were superior to the standards set up for grades XX and XXX as set by the ASTM. Furthermore, the laminate possessed especially good punching qualities, at least equal to those possessed by tung oil modified phenolics.

A particularly outstanding property possessed by the laminates such as shown in Fig. 1 of the drawing was unusually satisfactory post-formability. Thus sheets of the laminate ⅛" thick could be heated, after being fully cured, to a temperature of about 100° C. and pressed into the complex member 20 shown in Fig. 2 of the drawing. The member 20 had sides 24 which were about 3" long and sides 26 which were about 6" long, the sides being 1" high. The bottom 22 was provided with a pair of bosses 28 at each end approximately ¼ inch above the level of the bottom. The member 20 could be produced from the heated laminate by using pressures of the order of 50 pounds per square inch. The resulting member 20 had no breaks or cracks at any of its corners. It was characterized by relatively smooth draws.

One undesirable characteristic possessed by previously known phenolic resins with respect to post-forming complex members from flat sheets, for example, resided in the fact that swelling and blistering often occurred when they were heated to temperatures of the order of 100° C. The laminates of the present invention have been heated for as long as 5 minutes in force draft ovens at a temperature of 150° C. without blistering or swelling. The material of this invention, therefore, has unexpected advantages not possessed by phenolic resinous compositions employed at present in the art.

For most applications, the weight of the resin applied to the sheet material should be about a minimum of 50% of the weight of the sheet material. For post-forming somewhat better results are obtained if the resin ratio is higher. Excellent results have been obtained when the amount of resin applied to the fabric or other sheet material has varied from 75% to 150% of the weight of the sheet material.

It is not necessary that the varnishes of the reaction products (A) and (B) be admixed for application to fibrous sheet material or the like. The fibrous sheet material may be treated initially in the resinous solution as produced in Example I, dried to remove the solvent and then coated with the resinous solution of Example II and dried. The order of application of the resinous compositions is immaterial. Several successive applications of first one resin then the other may be accomplished.

The following example illustrates this procedure:

Example IV

The resinous solution of Example I was applied to 6½ ounce unbleached cotton drill cloth until the amount of resin solids applied was equal to 50% of the weight of the cloth. The dried treated material was then coated with the aniline-phenol-formaldehyde resin solution of Example II until the total weight of the resins equaled the weight of the cloth. Laminates prepared from the material of this example by molding the 1,000 pounds per square inch at 165° C. for 55 minutes were similar in all respects to the laminates of Example III.

The molding pressures and temperatures for producing the laminates may be varied within a wide range. Pressures of as much as 5,000 pounds per square inch and temperatures of up to 175° C. may be employed as an upper limit and pressures less than 1,000 pounds per square inch and temperatures as low as 130° C. may be applied though longer curing times are required in the latter case.

Satisfactory laminates were made from various sheet materials by applying thereto the following compositions:

Example V

A diphenylamine-phenol-formaldehyde resin was prepared using proportions of ⅓ mole of diphenylamine, one mole of phenol and 1.55 moles formaldehyde. The reaction procedure was similar to that set forth in Example I. Equal parts by weight of the resulting resin and the resin of Example II were combined and applied to cotton fabric. The resin-treated fabric was laminated and molded under heat and pressure. The physical and electrically insulating properties were excellent.

Example VI

| | Parts by weight |
|---|---|
| Phenol | 94 |
| Aniline | 38 |
| Formaldehyde | 53 | were reacted in accordance with the procedure set forth under Example II. Equal parts of the composition of Example I and of the present example were mixed and applied to cotton cloth. Laminates made therefrom under heat and pressure exhibited excellent physical and electrical insulating properties.

Example VII 25 parts by weight of the resin of Example I was admixed with 75 parts by weight of the resin of Example II. The resulting composition was applied to fibrous sheet material and molded into a laminate under heat and pressure. The resulting laminate had satisfactory physical and electrical insulating properties.

Example VIII 75 parts by weight of the resinous composition of Example I was admixed with 25 parts by weight of the resinous composition of Example II and applied to a fibrous sheet material. Upon molding under heat and pressure laminated products were produced having the outstanding characteristics set forth under Example III.

The varnish compositions of the above examples may be compounded with various additives to modify and improve the properties of the resulting molded members. Thus plasticizers, such as dibutyl sebacate and diamyl phthalate, die lubricants, such, for example, as stearates and waxes, solid fillers, such, for example, as finely divided graphite, bentonite, alumina, iron oxide and silica, pigments and dyes may be incorporated in the varnishes.

Fibrous materials treated with the resinous compositions of this invention may be chopped or macerated, compounded with various additives, and then molded under heat and pressure into members.

The above examples are illustrative and not limiting and it will be understood that various modifications may be made without departing from the scope of the invention.

I claim as my invention:

1. In the process of preparing resinous laminates, the steps comprising applying to a fibrous sheet material (A) the thermosetting partial reaction product derived by simultaneously reacting one mole of a phenol, from 0.1 to 0.6 mole of a secondary diaryl monoamine and sufficient formaldehyde to provide from 0.8 to 1.5 moles for each mole of the phenol and diarylmonoamine, and (B) the thermosetting partial reaction product of one mole of phenol, from 0.3 to 1.1 moles of a primary monoarylamine, and sufficient formaldehyde to provide from 0.8 to 1.5 moles for each mole of phenol and 0.8 to 2.4 moles for each mole of the monoarylamine, the weight ratio of the reaction products ranging from 1 to 10 for (A) to 10 to 1 for (B).

2. In the process of preparing resinous laminates, the steps comprising applying to a fibrous sheet material (A) the thermosetting partial reaction product derived by simultaneously reacting one mole of a phenol, from 0.1 to 0.6 mole of a diphenylamine and sufficient formaldehyde to provide from 0.8 to 1.5 moles for each mole of the phenol and diphenylamine, and (B) the thermosetting partial reaction products of one mole of phenol, from 0.3 to 1.1 moles of aniline, and sufficient formaldehyde to provide from 0.8 to 1.5 moles for each mole of phenol and 0.8 to 2.5 moles for each mole of the aniline, the weight ratio of the reaction products ranging from 1 to 10 for (A) to 10 to 1 for (B).

3. The process of claim 1, in which the partial reaction products (A) and (B) are applied as a mixture.

4. The process of claim 1, in which the fibrous sheet material is dipped first into a solution of one of the partial reaction products (A) and (B), dried to remove the solvent, then dipped in a solution of the other reaction product and dried to remove the solvent.

5. A resinous member comprising fibrous material and a thermoset resinous binder applied thereto, the resinous binder comprising (A) the partial reaction product derived by simultaneously reacting one mole of a phenol, from 0.1 to 0.6 mole of a secondary diaryl monoamine and sufficient formaldehyde to provide from 0.8 to 1.5 moles for each mole of the phenol and diarylmonoamine, and (B) the thermosetting partial reaction product of one mole of phenol, from 0.3 to 1.1 moles of a primary monoarylamine, and sufficient formaldehyde to provide from 0.8 to 1.5 moles for each mole of phenol and 0.8 to 2.5 moles for each mole of the monoarylamine, the weight ratio of the reaction products ranging from 1 to 10 of (A) to 10 to 1 of (B).

6. A resinous laminate comprising sheet fibrous material and a thermoset resinous binder applied thereto, the resinous binder comprising (A) the partial reaction product derived by simultaneously reacting one mole of a phenol, from 0.1 to 0.6 mole of a diphenylamine and sufficient formaldehyde to provide from 0.8 to 1.5 moles for each mole of the phenol and diphenylamine, and (B) the thermosetting partial reaction product of one mole of phenol, from 0.3 to 1.1 moles of aniline, and sufficient formaldehyde to provide from 0.8 to 1.5 moles for each mole of phenol and 0.8 to 2.5 moles for each mole of the aniline, the weight ratio of the reaction products ranging from 1 to 10 for (A) to 10 to 1 for (B).

7. Resin treated fibrous sheet material comprising sheet fibrous material impregnated with the heat-treated combined resinous reaction product of (A) the thermosetting partial reaction product derived by simultaneously reacting one mole of a phenol, from 0.1 to 0.6 mole of a secondary diaryl monoamine and sufficient formaldehyde to provide from 0.8 to 1.5 moles for each mole of the phenol and diarylmonoamine, and (B) the thermosetting partial reaction product of one mole of phenol, from 0.3 to 1.1 moles of a primary monoarylamine, and sufficient formaldehyde to provide from 0.8 to 1.5 moles for each mole of phenol and 0.8 to 2.5 moles for each mole of monoarylamine, the weight ratio of the reaction products ranging from 1 to 10 for (A) to 10 to 1 for (B), the resinous reaction product being convertible to a thermoset state on further heat treatment.

FRITZ J. NAGEL.

REFERENCES CITED

The following references are of record in the file of this patent:

UNITED STATES PATENTS

| Number | Name | Date |
|---|---|---|
| 1,955,731 | Bender | Apr. 24, 1934 |
| 1,982,486 | Schlingman | Nov. 27, 1934 |
| 2,029,525 | Ellis | Feb. 4, 1936 |

FOREIGN PATENTS

| Number | Country | Date |
|---|---|---|
| 363,694 | Great Britain | Dec. 18, 1931 |